United States Patent [19]

Terajima

[11] Patent Number: 5,460,043
[45] Date of Patent: Oct. 24, 1995

[54] VIBRATORY GYROSCOPE

[75] Inventor: Kokichi Terajima, Tokyo, Japan

[73] Assignee: Akai Electric Co., Ltd., Tokyo, Japan

[21] Appl. No.: 946,284

[22] Filed: Sep. 16, 1992

[30] Foreign Application Priority Data

Sep. 17, 1991 [JP] Japan ................................. 3-262564

[51] Int. Cl.$^6$ .................................................. G01P 15/08
[52] U.S. Cl. ................................................. 73/504.12
[58] Field of Search ....................... 73/505, DIG. 4, 73/504, 517 AV; 310/316

[56] References Cited

U.S. PATENT DOCUMENTS

| 3,520,195 | 7/1970 | Tehon ........................................ 73/505 |
| 4,791,815 | 12/1988 | Yamaguchi et al. ................... 73/505 |

FOREIGN PATENT DOCUMENTS

| 62-19713 | 1/1987 | Japan . |
| 2266215 | 10/1990 | Japan . |
| 0266214 | 10/1990 | Japan ........................................ 73/505 |
| 2293621 | 12/1990 | Japan . |
| 2293620 | 12/1990 | Japan . |

OTHER PUBLICATIONS

T. Konno et al, "Excitation and Signal Detection in Vibratory Gyroscopes" pp. 126–127 of Report No. XXXIII–180–1114 (Oct. 1984), Report of Research Association for Application of Barium Titanate.

*Primary Examiner*—Hezron E. Williams
*Assistant Examiner*—Christine K. Oda
*Attorney, Agent, or Firm*—Meltzer, Lippe, Goldstein, et al.

[57] ABSTRACT

A vibrating gyroscope comprises a vibrating element which is polygonal, e.g., rectangular, in cross-section, at least two piezoelectric elements adhered to at least one side of the vibrating element, and a variable resistor. The variable resistor includes at least two fixed terminals and a variable terminal for varying the resistance of the variable resistor. The piezoelectric elements are connected to the two fixed terminals of the variable resistor, while the variable terminal is grounded. This brings the output voltages generated by the piezoelectric elements into phase thereby improving measurement of angular velocity. In a preferred embodiment, a fixed resistor is disposed between the variable terminal of the variable resistor and the ground potential.

7 Claims, 3 Drawing Sheets

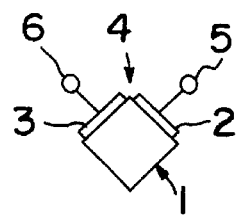
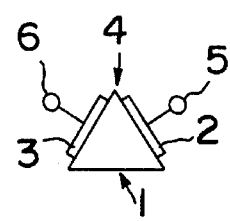
FIG.1a  FIG.1b
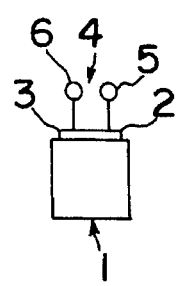
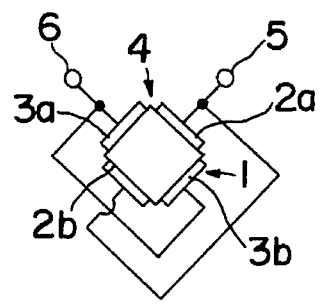
FIG.1c  FIG.1d
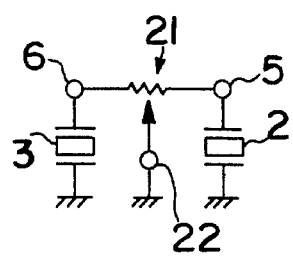
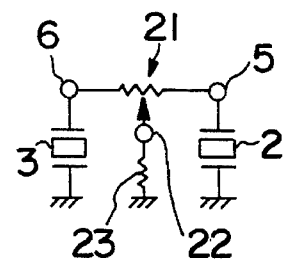
FIG.2a  FIG.3
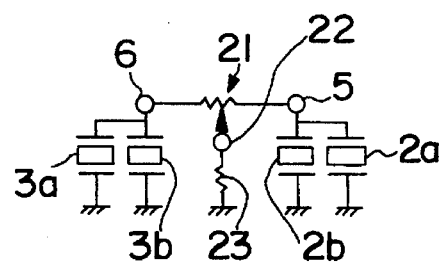
FIG.4

VIBRATORY GYROSCOPE

FIELD OF THE INVENTION

The present invention relates to a vibratory gyroscope for use in the detection of angular velocity, and is particularly intended to improve the accuracy of detection of angular velocity.

BACKGROUND OF THE INVENTION

FIGS. 6a–6b show an example of a conventional vibratory gyroscope.

As shown in FIG. 6a, a vibrator 4 in such conventional vibratory gyroscope includes a vibrating element 1 having a rectangular shape in cross-section, and two piezoelectric elements 2 and 3 adhered on two adjacent sides. As shown in FIG. 6b, the piezoelectric elements 2 and 3 are connected to impedance elements $Z_1$ and $Z_2$ through terminals 5 and 6, respectively, while capacitance elements 7 and 8 are disposed in parallel with the piezoelectric elements 2 and 3 and are connected to impedance elements $Z_3$ and $Z_4$ through terminals 9 and 10, respectively. The impedance elements $Z_1$, $Z_2$, $Z_3$, and $Z_4$ are further connected to a drive means 30 (as shown in FIG. 2b) through a common connecting terminal 11.

In the illustrated vibratory gyroscope, when an A.C. current for exciting the gyroscope is applied to the piezoelectric elements 2 and 3, the vibrator 4 vibrates with bending in the upward and downward directions as shown by an arrow 12 in FIG. 6a. Under such vibration, a self-induced vibration loop is formed by feeding back a differential output, from differential circuit 32, from terminals 5 and 9 as well as a differential output, from differential circuit 33, from terminals 6 and 10 to the drive means 30 (as shown in FIG. 2b). This provides vibrator 4 with continuous bending vibration in the direction shown by the arrow 12.

Under such vibration, when the vibrator 4 is rotated about its axis in the direction shown by arrow 13 in FIG. 6a, the vibrator 4 vibrates with bending due to Coriolis force in the direction shown by arrow 14 which is perpendicular to the direction of the self-induced vibration. This results in generating different voltages in the piezoelectric elements 2 and 3. Consequently, angular velocity may be measured by detecting, by means of detector 31 as shown in FIG. 2b, the difference in the generated voltages.

However, in general, the vibrating element 1 of a vibratory gyroscope inherently has errors in size and variations in its composition, and each piezoelectric element is different in its capacitance value. For this reason, the resonant frequency on each side of the vibrating element 1 on which one of the piezoelectric elements 2 or 3 is adhered is different from that on a side perpendicular to the aforementioned side. Accordingly, this brings about a difference in phase of the output voltages of the piezoelectric elements which prevents the user of the vibratory gyroscope from accurate measurement of angular velocity.

As the Coriolis force generated by rotation of the vibrator 4 increases in proportion to the rotational speed, this also increases the amplitude of the vibration shown by arrow 14 in FIG. 6a. On the other hand, the resonant frequency of the vibrator 4 generally decreases in proportion to an increase in amplitude of vibration. Consequently, when the vibrator 4 is rotated, a phase difference occurs in the output voltages of the piezoelectric elements 2 and 3 in relation to the rotational speed. This means that the output voltages do not increase in proportion to the rotational speed, and therefore, it is difficult to improve the accuracy in measurement of angular velocity.

Additionally, strain may occur in each of piezoelectric elements 2 and 3 mainly due to changes in temperature during periods of non-operation of the gyroscope. This means that electric charges may arise in the terminals 5 and 6 during periods of non-operation, and therefore may cause problems in that the level of the output voltage may be unstable for a period immediately after the gyroscope is again operated.

The present invention is intended to solve the above-mentioned problems encountered in a conventional gyroscope. Accordingly, the object of the present invention is to provide a vibratory gyroscope in which detection accuracy is improved and phase differences between the generated voltages in each piezoelectric element are eliminated. A further object of the present invention is to provide a vibratory gyroscope capable of sufficiently discharging the electric charges arising when the gyroscope is not in operation.

SUMMARY OF THE INVENTION

In the vibratory gyroscope according to the present invention, the vibrator is constructed in such a manner that at least two piezoelectric elements are adhered to one or more sides of a vibrating element having a polygonal shape in its cross-section, e.g., a triangle or a rectangle, and a variable resistor is further provided having fixed terminals connected to the piezoelectric elements and a variable terminal, by means of which the resistance of the variable resistor is varied, which is grounded. In a more favorable embodiment, the variable terminal of the variable resistor is grounded through a fixed resistor.

In the vibratory gyroscope according to the present invention, the two fixed terminals and one variable terminal of the variable resistor are connected to the piezoelectric elements and ground potential, respectively. The regulation of the variable resistor effectively makes the product of the capacitance value of each piezoelectric element and the resistance value equal, thereby adjusting the voltages generated in the two piezoelectric elements to the same phase. This results in appropriate operation of self-induced oscillation which effectively improves detection accuracy of angular velocity.

Further improvement of detection accuracy occurs when the variable terminal which varies the resistance of the variable resistor is grounded through a fixed resistor, because this provision advantageously reduces variation of the generated voltage during the rotation of the gyroscope in addition to phase equalization of the generated voltages of the two piezoelectric elements.

Furthermore, grounding of the variable terminal of the variable resistor is instrumental in discharging the aforementioned electric charges in the piezoelectric elements which are generated while the vibratory gyroscope is not in operation. Therefore, the vibratory gyroscope according to the present invention also provides a stable voltage level even immediately after initiation of operation.

BRIEF DESCRIPTION OF THE DRAWINGS

FIGS. 1a–1d are frontal views of examples of a vibrator according to the present invention.

FIG. 2a–2b is a circuit diagram according to the present invention.

FIG. 3 is another circuit diagram according to the present invention.

FIG. 4 is a further circuit diagram according to the present invention, applicable to the vibrator shown in FIG. 1d.

DETAILED DESCRIPTION OF PREFERRED EMBODIMENTS

Figure 2B:
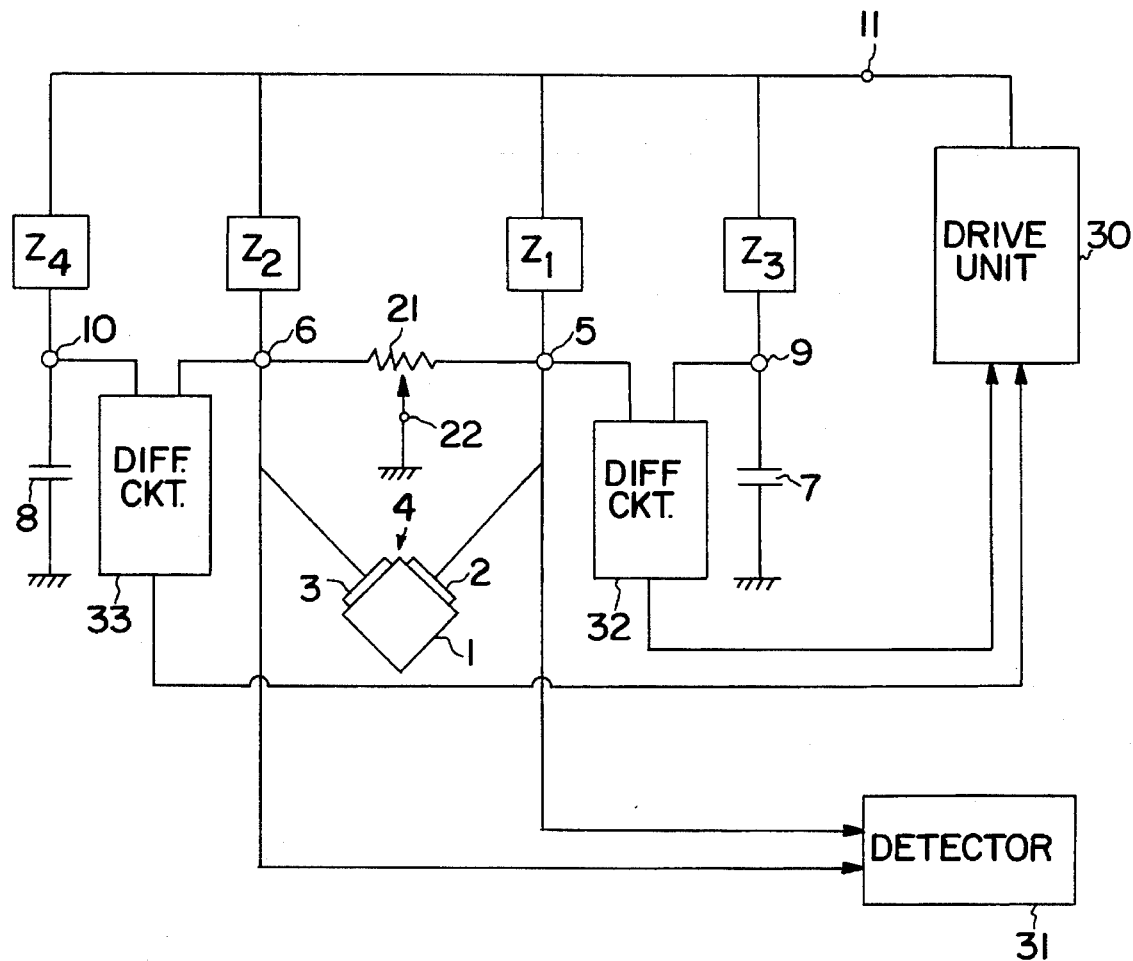

The following is an explanation of preferred embodiments according to the present invention, in which the attached drawings are referred to.

FIGS. 1a–1d show frontal views of examples of the vibrating elements of a vibratory gyroscope according to the present invention. In the drawings, reference numerals identical with those in the prior art refer to identical parts.

Figure 6A:
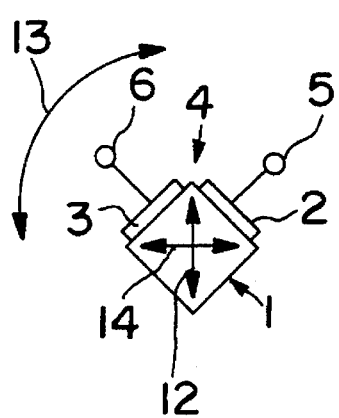
FIGS. 6a–6b show an example of a prior art vibrator.
Figure 6B:
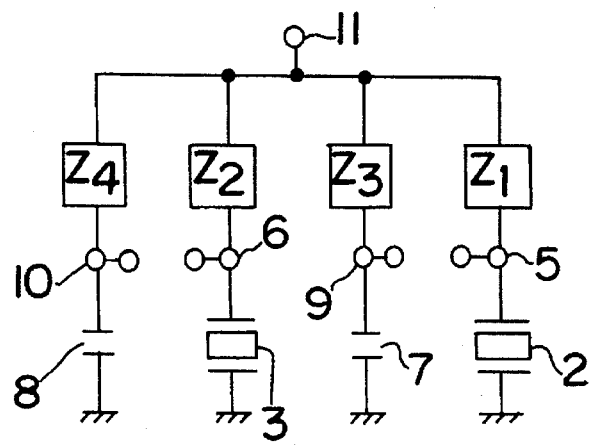

FIG. 1a illustrates a vibrator 4 which is identical in many respects with the prior art example shown in FIG. 6a. It includes a vibrating element 1 which is rectangular in cross-section and two piezoelectric elements 2 and 3 adhered on two adjacent sides of the vibrating element.

Such vibrator 4 shown in FIG. 1a is excited basically in the same manner as the prior art example. However, attention should be directed to the piezoelectric elements 2 and 3 which are directly connected in parallel each other. That is, referring to FIGS. 2a and b, two fixed terminals 5 and 6 of a variable resistor 21 are connected to piezoelectric elements 2 and 3, respectively, and a variable terminal 22 by means of which the resistance of the variable resistor 21 is grounded. This contrasts with the prior art in which piezoelectric elements 2 and 3 are independently connected to the drive means through the common terminal 11.

In the embodiment shown in FIG. 1a, the piezoelectric elements 2 and 3 generate voltages which have the same phase as each other when the variable terminal 22 is regulated so that the products of the capacitance values of the respective piezoelectric elements 2 and 3 and the resistance value between each piezoelectric element and the variable terminal 22 are equal to each other. Furthermore, even though strain on the piezoelectric elements 2 and 3 occurs due to temperature changes during non-operation of the gyroscope and this results in generation of electric charges in the piezoelectric elements 2 and 3, these electric charges are discharged through the variable terminal 22 which is grounded. Consequently, in the vibratory gyroscope according to the present invention, a sufficiently stabilized voltage level is obtained even in the period immediately after initiation of operation.

FIG. 3 shows another embodiment of the invention in which the variable terminal 22 is grounded through a fixed resistor 23 in addition to the provisions mentioned above. In this example, in addition to the operation and advantages mentioned above, phase variation in the voltage generated is effectively reduced by interaction of the generated voltage. Therefore, detection accuracy of angular velocity is further improved.

The above explanation is based upon a type of a vibratory gyroscope having the vibrator shown in FIG. 1a. Nevertheless, it should be noted that the present invention is applicable to other types of vibrators as well, e.g., the type shown in FIG. 1b in which a vibrating element has a triangular shape in cross-section and two piezoelectric elements 2 and 3 are adhered on two sides thereof respectively, or the type shown in FIG. 1c in which a vibrating element has a rectangular shape in cross-section and separate piezoelectric elements 2 and 3 are adhered on a single side thereof.

The vibrator shown in FIG. 1d is an example of a modification of the vibrator shown in FIG. 1a. The vibration element 1 has a rectangular shape in cross-section, and two pairs of piezoelectric elements 2a–2b and 3a–3b are adhered on opposite sides of the vibrating element 1 so that the vibrator may be operated with increased excitation.

In this embodiment, pairs of piezoelectric elements on opposite sides of the vibration element are connected to each other, and their respective terminals 5 and 6 are grounded through a variable resistor 21 and a fixed resistor 23 as shown in FIG. 4. In this example, the same advantage as that in the example shown in FIG. 3 is obtained.

Figure 5:
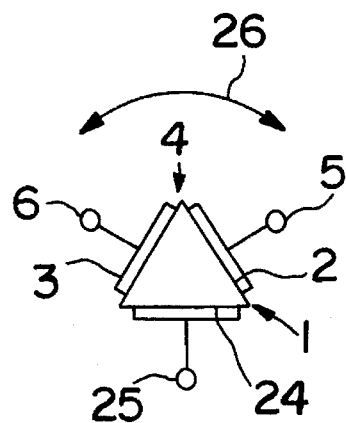
FIG. 5 is a frontal view of another example of the inventive vibrator.

FIG. 5 shows a known vibrator having a vibrating element 1 with triangular shape in cross-section and piezoelectric elements 2, 3 and 24 are adhered on the three sides thereof. For the self-induced oscillation of the vibrating element 1, A.C. current for exciting the vibrator 4 is applied through a terminal 25, and the generated voltages in the piezoelectric elements 2 and 3 are fed back to the drive means. Under such oscillation, when the vibrating element 1 is rotated in the direction shown by an arrow 26, angular velocity is measured by detecting the difference between the voltages generated in the respective piezoelectric elements. The vibrators shown in FIGS. 3, 4 and 5 can also be used in the system shown in FIG. 2b.

With respect to other known vibrators 4 above-mentioned, the same effect will be obtained by connecting the terminals 5 and 6 to the variable resistor 21 as shown in FIGS. 2a–b and 3.

While the invention has been described by reference to specific embodiments, this was for purposes of illustration only. Numerous alterative embodiments will be apparent to those skilled in the art and are considered to be within the spirit and the scope of the invention.

I claim:

1. A vibratory gyroscope comprising
   a drive unit,
   a vibrating element which is polygonal shaped in cross-section,
   at least first and second piezoelectric elements adhered to at least a first side of said vibrating element,
   a detector, and
   a variable resistor including at least first and second fixed terminals, and a variable terminal for varying the resistance of said variable resistor,
   wherein said first and second piezoelectric elements are connected to said first and second fixed terminals respectively, and said variable terminal is connected to a ground potential, and
   wherein said first and second piezoelectric elements are further connected to said drive unit and said detector for self-induced vibration and signal detection, respectively.

2. The vibratory gyroscope of claim 1 further comprising a fixed resistor connected between said variable terminal and said ground potential.

3. The vibratory gyroscope of claim 1 wherein said first piezoelectric element is adhered to said first side and said second piezoelectric element is adhered to a second side of said vibrating element.

4. The vibratory gyroscope of claim 3 wherein said first and second sides are adjacent to each other.

5. The vibratory gyroscope of claim 1 wherein said vibrating element is rectangular in cross-section.

6. The vibratory gyroscope of claim 1 wherein said vibrating element is triangular in cross-section.

7. The vibratory gyroscope of claim 1 further comprising third and fourth piezoelectric elements, wherein said vibrating element is rectangular in cross-section, wherein said first and third piezoelectric elements are adhered to a first set of opposite sides of said vibrating element and said second and fourth piezoelectric elements are adhered to a second set of opposite sides of said vibrating element, wherein said first and third piezoelectric elements are connected to each other before being connected to said first fixed terminal of said variable resistor, and wherein said second and fourth piezoelectric elements are connected to each other before being connected to said second fixed terminal of said variable resistor.

* * * * *